(12) United States Patent
Akashe et al.

(10) Patent No.: US 6,235,336 B1
(45) Date of Patent: May 22, 2001

(54) EGG YOLK COMPOSITIONS

(75) Inventors: Ahmad Akashe, Mundelein; Maria Teresa Zayas, Skokie, both of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/389,124

(22) Filed: Sep. 2, 1999

(51) Int. Cl.⁷ ..................................................... A23L 1/32
(52) U.S. Cl. ............................................ 426/614; 614/422
(58) Field of Search ..................................... 426/614, 422

(56) References Cited

U.S. PATENT DOCUMENTS

| | | | |
|---|---|---|---|
| 4,333,959 | 6/1982 | Bracco et al. | 426/614 |
| 4,675,202 | 6/1987 | Wenger et al. | 426/614 |
| 5,080,911 | 1/1992 | Saitou et al. | 426/32 |
| 5,312,640 | 5/1994 | Lombardo et al. | 426/614 |
| 5,314,706 | 5/1994 | Colarow et al. | 426/608 |
| 5,484,624 * | 1/1996 | Awad et al. | |

FOREIGN PATENT DOCUMENTS 62-162454   7/1987   (JP) .

OTHER PUBLICATIONS

Zunn, Paola, et al., "Cholesterol Oxidation in Baked Foods Containing Fresh and Powdered Eggs", *Journal of Food Science*, vol. 60, No. 5, pp. 913–916, 1995.

Huber, K. C., et al., "Antioxidant Inhibition of Cholesterol Oxidation in a Spray–Dried Food System During . Accelerated Storage", *Journal of Food Science*, vol. 60, No. 5, pp. 909–912, 1995.

Palmer, H. H., "Salted Egg Yolks", *Food Technology*, vol. 23, Nov. 1969, pp. 1480–1530.

Chuang, Siew, et al., "Heat Denaturation and Emulsifying Properties of Egg Yolk Phosvitin", *Journal of Foods Science*, vol. 60, No. 5, pp. 906–908, 1995.

* cited by examiner

*Primary Examiner*—Anthony J. Weier
(74) *Attorney, Agent, or Firm*—Fitch, Even, Tabin & Flannery

(57) ABSTRACT

This disclosure relates to egg yolk compositions with improved functionality as well as methods of preparing such egg yolk compositions. Such egg yolk compositions confer improved functionality to the food products into which they are incorporated. The egg yolk compositions are prepared by a process comprising: (1) forming an aqueous egg yolk mixture; (2) adding an alkaline material to the aqueous egg yolk mixture in an amount sufficient to adjust the pH of the aqueous egg yolk mixture to about 7.5 or above; (3) heating the pH-adjusted aqueous egg yolk mixture to about 40 to about 80° C. for a period of about 30 minutes or longer; (4) cooling the heat treated aqueous egg yolk mixture to or close to ambient temperatures; and (5) added an acidic material to the cooled aqueous egg yolk mixture to adjust the cooled aqueous egg yolk mixture to a neutral pH, thereby forming the aqueous egg yolk composition; wherein the aqueous egg yolk composition can be used in food compositions to impart improved egg yolk functionality. The use of the compositions and methods of the disclosure lead to the use of less egg yolk, oil, and/or other ingredients in the food compositions described herein, thereby reducing the cost of producing large quantities of such food products. Such reductions in cost could be translated to the general public, and thereby serve the consumer.

27 Claims, No Drawings

EGG YOLK COMPOSITIONS

This invention relates to egg yolk compositions with improved functionality and to methods of preparing such egg yolk compositions. Such compositions confer improved functionality to the food products in which they are incorporated.

BACKGROUND OF THE INVENTION

In an industry wherein thousands of pounds of food product may be generated in a manufacturing process for public sale and consumption, there is a desire on the part of the food processing industry to identify methods to reduce the cost of preparation of such food products. Such food compositions include, for example spoonable dressings, mayonnaise compositions, pasta products such as egg noodles, baked goods, desserts such as cakes, custards, puddings and pies, frozen desserts, sour cream preparations, cream cheese spreads, and the like.

Eggs are often used in conventional spoonable food products such as, for example, mayonnaise spreads, certain types of salad dressings, desserts such as custards and puddings, frozen dessert products, sour cream products, and cream cheese products. Although many food compositions can be made by simply eliminating eggs, especially the yolk, from the recipe, the resulting food compositions are generally adversely affected. For example, the elimination of eggs often results in poorer flavor, texture, and odor. Thus, such egg-free or reduced level egg food products have generally not received high acceptance by consumers.

Numerous attempts have been made to provide such foods with acceptable organoleptic properties and/or to treat eggs or egg products to make them more acceptable in generating food products with desirable organoleptic properties. For example, U.S. Pat. No. 5,080,911 to Saitou et al. relates to a process for modifying the properties of egg yolk wherein egg yolk is treated with phospholipase D, resulting in the conversion of phospholipids contained therein into phosphatidic acid and thereby improving the emulsifying characteristics of the treated egg yolk.

U.S. Pat. No. 4,675,202 to Wenger et al. relates to a process for sterilizing egg yolk wherein an aqueous slurry of egg yolk is acidified to a pH of less than 6.0 and then treated under ultra high temperature processing conditions for a time sufficient to sterilize said egg yolk.

U.S. Pat. No. 5,314,706 to Colarow et al. relates to an egg yolk composition fortified with exogenous soybean lysophospholipids (an emulsification agent used in oil and water emulsions). The lysophospholipids may be obtained by hydrolyzing phospholipids derived from soybeans with phospholipase A2, deactivating the phospholipase A2, and then heat treating the resulting lysophospholipids. The use of lysophospholipids in egg yolk compositions is reported to increase the emulsification characteristics of the egg yolk compositions.

Palmer et al., "Salted Egg Yolks: 2. Viscosity and Performance of Acidified, Pasteurized and Frozen Samples," *Food Technology*, Vol. 23, pp. 1486–1488, reports that acidification treatment of salted egg yolks, alone does not affect the formation of stable mayonnaise. Acidification in combination with pasteurization, however, damages the emulsifying characteristics of such treated egg yolks.

Chung et al., "Heat Denaturation and Emulsifying Properties of Egg Yolk Phosvitin", *Journal of Food Science*, Vol. 60, pp. 906–908, states that heat treatment of phosvitin, the major phosphoprotein in egg yolk, decreased the emulsion-stabilizing ability of egg yolks to which such treated phosvitin is added.

There remains a need for a source of egg yolk compositions for use in emulsion-containing food products which permits use of less egg yolk, oil, and/or other ingredients in the emulsion-containing food products, thereby significantly reducing the cost of such food products, while at the same time, not significantly affecting the textural, organoleptic and flavor-containing properties of the food product. There is likewise a need for methods for the generation of such egg yolk compositions which significantly reduce the amounts of eggs, oil, and/or other ingredients (e.g., thickeners, gums, starches, and other emulsifiers) that are required for the manufacture of egg yolk-containing emulsion-based food products. The present invention provides such compositions and methods.

SUMMARY OF THE INVENTION

The present invention provides egg yolk compositions with significantly improved functionality. Such compositions are provided for by the treatment of aqueous egg yolk with an alkali component, heating the alkali-treated egg yolk, cooling the alkali-treated egg yolk and adding an acidic component to the alkali-treated egg yolk to neutralize it prior to use in food products. The resulting egg yolk compositions may be used in a wide variety of food products.

The egg yolk compositions of the present invention confer to food products in which they are incorporated increased functionality as compared to similar food products prepared using untreated egg yolk (fresh or salted). This increased functionality provides increased yield stress and viscosity in spoonable products and improved textural properties in baked goods. The compositions of the present invention are particularly useful because (1) they permit the use of less egg yolk in the preparation of food products described herein to achieve the same texture, mouthfeel, stability, flavor intensity, and rheological characteristics as is achieved using higher levels of untreated egg yolk in food products; (2) they permit the use of reduced amounts of oil and/or other ingredients (e.g., thickeners, gums, starches, and other emulsifiers) in the preparation of food products described herein to achieve the same texture, mouthfeel, stability, flavor intensity, and rheological characteristics achieved using untreated egg yolk in food products; (3) they provide significant cost savings in the preparation of food products for mass consumption because of the reduced amount of oil and egg yolk required to achieve food products with satisfactory organoleptic and flavor characteristics comparable to those of food products produced using conventional amounts of untreated egg yolks and oil; and (4) the food products generated using the egg yolk compositions of the disclosure exhibit characteristics of higher functionality and robustness under harsh conditions when than do food products made with untreated fresh or salted egg yolk.

The present invention provides an egg yolk composition with improved functionality. The alkali- and heat-treatment conditions (i.e., the pH, temperature, and duration of treatment) should be sufficient to provide an egg yolk composition which confers increased functionality to the food products in which the egg yolk composition is incorporated. That is, spoonable food products exhibit increased viscosity and yield stress and baked food products exhibit improved textural properties, when compared with similar food products generated using similar amounts of untreated fresh or salted egg yolk. The alkali- and heat-treated egg yolk compositions of this invention have only a slightly increased viscosity as compared to their untreated egg yolk counterparts.

To achieve the egg yolk compositions of the present invention, egg yolk diluted in aqueous solution is treated with an alkali component to adjust the pH of the aqueous egg yolk solution to about 7.5 to about 12 and preferably to about 8 to about 10. The alkali-treated egg yolk solution is then treated at an elevated temperature. Generally the elevated temperature is in the range from about 40° C. to about 80° C. and continues for about one-half hour to about five hours; preferably, treatment is about 50° C. to about 75° C. for about one-half hour to about four hours; and more preferably treatment is about 60° C. to about 70° C. for about one hour to about three hours. The resulting egg yolk solution is then cooled to a temperature in the range from about 10° C. to about 40° C.; preferably about 20° C. to about 30° C.; and most preferably about 25° C. The pH of the resulting cooled egg yolk solution is then neutralized with an edible acid. Preferably, the pH is adjusted to near the initial pH of untreated egg yolk such as between about 4.5 and about 6.5 and preferably between about 5 to about 6.

The invention provides a process for preparing an aqueous egg yolk composition having improved egg yolk functionality, said process including: (1) forming an aqueous egg yolk mixture; (2) adding an alkaline component to the aqueous egg yolk mixture in an amount sufficient to adjust the pH of the aqueous egg yolk mixture to about 7.5 or above; (3) heating the pH-adjusted aqueous egg yolk mixture to about 40 to about 80° C. for a period of about 30 minutes or longer; (4) cooling the heat treated aqueous egg yolk mixture to or near ambient temperatures; and (5) added an edible acidic component to the cooled aqueous egg yolk mixture to obtain a neutral pH, thereby forming the aqueous egg yolk composition; wherein the aqueous egg yolk composition can be used in food compositions to impart improved egg yolk functionality.

The invention further provides an aqueous egg yolk composition with improved egg yolk functionality for use in food compositions, wherein the aqueous egg yolk composition is prepared by a process including: (1) forming an aqueous egg yolk mixture; (2) adding an alkaline component to the aqueous egg yolk mixture in an amount sufficient to adjust the pH of the aqueous egg yolk mixture to about 7.5 or above; (3) heating the pH-adjusted aqueous egg yolk mixture to about 40 to about 80° C. for a period of about 30 minutes or longer; (4) cooling the heat treated aqueous egg yolk mixture to or close to ambient temperatures; and (5) added an edible acidic component to the cooled aqueous egg yolk mixture to adjust the cooled aqueous egg yolk mixture to a neutral pH, thereby forming the aqueous egg yolk composition; wherein the aqueous egg yolk composition can be used in food compositions to impart improved egg yolk functionality.

DETAILED DESCRIPTION OF THE INVENTION

The present invention provides egg yolk compositions with improved functionality and methods of preparing such egg yolk compositions. The egg yolk compositions of the present invention comprise aqueous egg yolk solutions which have been treated under basic conditions at elevated temperatures. After treatment, the aqueous egg yolk solution is cooled to ambient temperatures and neutralized with an acidic component. Also disclosed are methods for the generation of such egg yolk compositions. The egg yolk compositions of the present invention may be used in a wide variety of food products. These egg yolk compositions allow the preparation of food products with the desired rheological characteristics generally associated with food products incorporating untreated fresh or salted egg yolk while incorporating lower levels of egg yolk, oil, and/or other ingredients. Moreover, the use of the egg yolk compositions of this invention allow the manufacture of food products using significantly lower amounts of egg yolk, oil, and/or other ingredients and, therefore, provide significant cost savings in the preparation of food products for mass consumption. Reduced amounts of egg yolk, oil, and/or other ingredients can be used to yield food products having desirable rheological, mouthfeel, and flavor characteristics.

The method of the present invention involves alkali-component treatment and heat treatment of an aqueous egg yolk solution. It has been found that treating egg yolk under the conditions described herein provides compositions with enhanced functionality, thereby providing food products containing these egg yolk compositions with higher viscosity more viscous and higher yield stress than conventional food products having comparable amounts of untreated fresh or salted egg yolk and oil. The egg yolk compositions of the present invention may be obtained by subjecting egg yolk to alkali treatment and heat treatment under conditions disclosed herein. Generally, an alkali component is added to an aqueous solution of egg yolk to adjust the pH of the aqueous egg yolk solution to about 7.5 to about 12; preferably about 8 to about 10. The alkali component-treated egg yolk solution is then subjected to elevated temperatures. Generally, the elevated temperature is in the range from about 40° C. to about 80° C. and continues for about one-half hour to about five hours; preferably, the temperature is in the range from about 50° C. to about 75° C. and continues for about one-half hour to about four hours; and more preferably the temperature is in the range from about 60° C. to about 70° C. and continues for about one hour to about three hours. The alkali-treated, heat-treated egg yolk solution is then cooled to ambient temperatures (generally about 10° C. to about 40° C.; preferably about 20° C. to about 30° C.; and more preferably about 25° C. The cooled egg yolk solution is then neutralized using an edible acid. Generally, the pH is adjusted to the pH normally found in untreated egg yolk (i.e., a pH of about 4.5 to about 6.5 and preferably about 5 to about 6.

The resulting egg yolk compositions of this invention, when incorporated into food products, have dramatically improved functionality. Thus, spoonable food products into which such egg yolk compositions are incorporated exhibit increased viscosity and yield stress when compared with food products generated using similar amounts of untreated fresh or salted egg yolk. Moreover, use of the egg yolk compositions of this invention in food products provides texture, mouthfeel, stability, and flavor intensity of comparable food products generated using larger quantities of fresh untreated or salted egg yolk and/or oil. These characteristics of increased functionality are imparted by the treatment of aqueous egg yolk solution with an alkali component, followed by treatment of the alkali-treated egg yolk solution at elevated temperature. The alkali component may be any edible alkali material, such as, for example, sodium hydroxide, calcium hydroxide, trisodium phosphate, potassium hydroxide, magnesium hydroxide, ammonium hydroxide, and the like, as well as mixtures thereof. The acid treatment to neutralize the alkali- and heat-treated egg yolk solution to the pH of untreated egg yolk may be effected by any edible acid, such as, for example, vinegar, lemon juice, lime juice, acetic acid, phophoric acid, lactic acid, citric acid, hydrochloric acid, and the like, as well as mixtures thereof. The alkali/acidic components may be added directly or as aqueous compositions.

The increased functionality imparted by the egg yolk compositions of the invention permits the use of less egg yolk in the preparation of food products as compared to the use of untreated, fresh, or salted egg yolk without adversely impacting organoleptic properties. Additionally, the increased functionality imparted by the egg yolk compositions of this invention also allows the use of less oil and/or other ingredients in such food products without adversely impacting organoleptic properties. The improved functionality of food products incorporating the egg yolk compositions of this invention results in the need for less egg yolk, oil, and/or other ingredients in the preparation of food products as compared to food products using untreated fresh or salted egg yolk. This reduction in amounts of egg yolk and/or oil to prepare food products with satisfactory functionality provides a significant reduction in cost of preparing food products made for mass consumption. Moreover, since the amounts of egg yolk and/or oil can be reduced without adversely affecting organoleptic properties, the overall cholesterol and/or fat content can also be reduced.

The pH, temperature, and duration of the heating step are important in the preparation of the egg yolk compositions of the present invention. Generally for the alkali treatment step of this invention, temperatures less than about 40° C. and pH values greater than about 12 should be avoided. Generally, the duration of this alkali treatment step should be at least one-half hour. As those skilled in the art will realize, treatment at temperatures in the lower ranges (i.e., at or slightly above 40° C.) will require longer period that treatments at higher temperatures to achieve comparable results. Generally, higher temperatures are preferred so that the duration of the alkali treatment step can be reduced.

While not wishing to be limited by theory, it is believed that improved egg yolk functionality provided by the egg yolk compositions of this invention is related to changes in the egg yolk proteins' structure such as unfolding, dissociation and/or reduction in crosslinking. Treatment of egg yolk with phospholipase, as described in the prior art, resulted in the conversion of lecithin to lysolecithin, with an increase in emulsifying properties. No increase in lysolecithin content in the alkali- and heat-treated egg yolk composition of the present invention were observed. Thus, the enhanced functionality of the egg yolk compositions of the present disclosure do not appear to be due to increased levels of lysophospholipids. The total triglyceride content of the alkali- and heat-treated egg yolk compositions of the present disclosure does, not, appear to be reduced in comparison to the total triglyceride content of untreated, fresh or salted egg yolks.

The alkali-treated, heated egg yolk compositions of this invention provide compositions which may be incorporated into a variety of food compositions in which egg yolk is desired. Such food compositions include, by way of non-limiting examples, spoonable dressings, mayonnaise compositions, pasta products such as egg noodles, baked goods, desserts such as cakes, custards, puddings and pies, frozen desserts, sour cream preparations, cream cheese spreads, and the like. Such food compositions may be full fat or have reduced fat levels.

Thus, the present disclosure includes food compositions in which textural, organoleptic, and flavor qualities provided by egg are provided by egg yolk compositions in which egg yolk has been treated with alkali and heat. The method provides food products with excellent organoleptic and functional attributes using lower amounts of egg yolk, oil, and/or other ingredients normally associated with such food products. The following examples are intended to illustrate the invention and not to limit it. Unless indicated otherwise, all percentages and ratios are based on weight.

EXAMPLE 1

Salted egg yolk (200 g; 10% salt) was diluted with water (170 g) and 1.0 N sodium hydroxide was used to adjust the pH to 9.0 The alkali-treated, salted egg yolk solution was heated with constant stirring at about 70° C. Sample aliquots were removed at one, two, and three hours. These samples were cooled to room temperature and then neutralized using 0.5N HCl to a pH of 5.6. The final egg yolk concentration was 50%.

The treated egg yolk compositions were used to prepare mayonnaise products using the following formula:

| Ingredients | Amount (%) |
| --- | --- |
| Soybean Oil | 80.4 |
| Water | 8.4 |
| Salted Liquid Egg Yolk | 7.0 |
| Salt | 0.975 |
| Sugar | 0.63 |
| Vinegar | 2.55 |

No egg whites were included in the formulation.

The emulsion was homogenized at 25,000 sec$^{-1}$ in a rotor/stator shear device (Pentax Mixer™ from Pentax, Bran and Luebbe, Buffalo Grove, Ill.), and then equilibrated at ambient temperatures. After equilibration, yield stress values were obtained. The control was prepared in a similar manner except that the egg yolk was not treated.

| Treatment Time (Hours) of Alkali-Adjusted Egg Yolk | Yield Stress T($P_a$) |
| --- | --- |
| Control* | 131 |
| 1 | 210 |
| 2 | 224 |
| 3 | 293 |

*No alkali or heat treatment.

Use of at least one hour heat treatment for the alkali-adjusted egg yolk composition resulted in a significant increase in the yield stress of the mayonnaise product. The inventive samples have excellent mouthfeel, texture, and flavor.

EXAMPLE 2

Salted egg yolk (200 g; 10% salt) was diluted with water (100 g); sufficient 2% calcium hydroxide was added to adjust the pH to 9.0. The alkali-treated, salted egg yolk solution was heated with constant stirring at about 60° C. Sample aliquots were removed at one-half hour, one hour, two hours, and four hours. Samples were then cooled to room temperature and neutralized to pH 5.6 with 1 N HCl. The final egg yolk concentration was 50%.

Untreated and treated egg yolk compositions were incorporated into the mayonnaise formula using in Example 1. After homogenization, the mayonnaise products were equilibrated at ambient temperature. After equilibration, rheological measurements were taken.

| Treatment Time (Hours) of Alkali-Adjusted Egg Yolk | Yield Stress T($P_a$) |
|---|---|
| Control* | 127 |
| 0.5 | 138 |
| 1 | 156 |
| 2 | 188 |
| 4 | 172 |

*No alkali or heat treatment.

Use of at least one-half hour heat treatment for the alkali-adjusted egg yolk composition resulted in a significant increase in the yield stress of the mayonnaise product. Preferably the heat treatment duration is at least one hour. The inventive samples have excellent mouthfeel, texture, and flavor.

EXAMPLE 3

Salted egg yolk (200 g; 10% salt) was diluted with water (100 g) and, using a 3.5% tri-sodium phosphate solution, the pH was adjusted to 9.0. The alkali-treated, salted egg yolk solution was heated with constant stirring at about 70° C. Sample aliquots were removed at one hour, two hours, and three hours. These samples were cooled to room temperature and then neutralized with 0.5N HCL to a pH of 5.6. The final egg yolk concentration was 50%.

Untreated and treated egg yolk compositions were incorporated into the mayonnaise formula of Example 1. After homogenization, the mayonnaise products were equilibrated at ambient temperatures. After equilibration, the following Theological measurements were obtained.

| Treatment Time (Hours) of Alkali-Adjusted Egg Yolk | Yield Stress T($P_a$) |
|---|---|
| Control* | 127 |
| 1 | 207 |
| 2 | 239 |
| 3 | 306 |

*No alkali or heat treatment.

Again, the use of at least one hour heat treatment for the alkali-adjusted egg yolk composition resulted in a significant increase in the yield stress of the mayonnaise product. Again, the inventive samples have excellent mouthfeel, texture, and flavor.

EXAMPLE 4

A mayonnaise was prepared with 75% soybean oil, egg whites, and the alkali-treated, heat-treated egg yolk. Salted egg yolk (200 g; 10% salt) was diluted with water (100 g). Using 1.0 N sodium hydroxide, the pH was adjusted to 9. The egg yolk solution was heated to 70° C. for three hours and then neutralized as described in Example 1.

The treated egg yolk composition was incorporated into a mayonnaise formula using the following formula:

| Ingredients | Amount (%) |
|---|---|
| Soybean Oil | 75 |
| Treated Egg Yolk (50% solution) | 7.0 |
| Dry Egg White | 0.4 |
| Water | 13.45 |
| Salt, sugar, & flavorings | 1.65 |
| Vinegar | 2.5 |

The product was homogenized as in Example 1 and then equilibrated at ambient temperatures to obtain a product having excellent mouthfeel, texture, and flavor. The yield stress of the resulting mayonnaise was 210 T($P_a$).

EXAMPLE 5

Mayonnaise was made with lower levels of oil and a low DE corn syrup in place of egg whites. The egg yolk was prepared in the same manner as described in Example 1 (3 hours of heat treatment of the basic solution). The following formula was used:

| Ingredients | Amount (%) |
|---|---|
| Soybean Oil | 75 |
| Treated Egg Yolk (50% solution) | 7.0 |
| 24 DE Corn Syrup | 6.0 |
| Water | 8.636 |
| Salt | 0.975 |
| Vinegar (120 grain) | 2.389 |

The product was homogenized as in Example 1 and then equilibrated at ambient temperatures. The resulting mayonnaise product had a yield stress of 220 T($P_a$) and had excellent mouthfeel, texture, and flavor.

EXAMPLE 6

This examples illustrate the preparation of the treated egg yolk composition and its use in a mayonnaise product on a pilot plant scale. Salted egg yolk (30 lbs) and water (25 lbs) were added to a tank (100 lb capacity) and mixed at high speed. With mixing, 0.5 N sodium hydroxide was added slowly to achieve a pH of 9.0. The alkaline egg yolk solution was then transferred into a preheated, jacketed tank which was outfitted with a high speed mixer. The jacketed tank was maintained at 70° C. for varying periods of time (i.e., 1 or 2 hours) using a circulating hot water source. The alkaline egg yolk solution was stirred throughout the heating step. After heat treatment, the egg yolk solution was cooled in a jacketed vessel using circulating chilled water in the jacket. When the treated egg yolk solution was cooled to about 25° C., 0.5N hydrochloric acid was added until a pH of about 5.5 to about 6.0 was obtained.

The resulting treated egg yolk samples were used to prepare mayonnaise products on a pilot plant scale. The following formula was used:

| Ingredients | Amount (%) |
|---|---|
| Soybean Oil | 80.4 |
| Treated Egg Yolk (50% solution) | 7.0 |

| Ingredients | Amount (%) |
| --- | --- |
| Water | 7.14 |
| Salt and sugar | 1.21 |
| Vinegar | 2.5 |

The products were was homogenized at 25,000 sec$^{-1}$ in a pilot plant scale rotor/stator shear device and then equilibrated at ambient temperatures. The following results were obtained.

| Treatment Time (Hours) of Alkali-Adjusted Egg Yolk | Yield Stress T($P_a$) |
| --- | --- |
| Control* | 150 |
| 1 | 190 |
| 2 | 199 |

*No alkali or heat treatment.

On the pilot scale, the use of at least one hour heat treatment for the alkali-adjusted egg yolk composition resulted in a significant increase in the yield stress of the mayonnaise product. The resulting mayonnaise product and had excellent mouthfeel, texture, and flavor.

It is estimated that, for a spoonable dressing, a reduction of about 50 to 60 percent for egg yolk and a reduction of about 5 percent for oil could be obtained without significant reduction in desirable organoleptic properties. This, of course, represents a significant cost savings in the manufacture of such spoonable dressing using the egg yolk compositions of this invention. Similar savings would also be expected using the egg yolk compositions of this invention in other egg-containing products.

What is claimed is:

1. A process for preparing an aqueous egg yolk composition having improved egg yolk functionality, said process comprising:
   (1) forming an aqueous egg yolk mixture;
   (2) adding an alkaline material to the aqueous egg yolk mixture in an amount sufficient to adjust the pH of the aqueous egg yolk mixture to about 7.5 or above;
   (3) heating the pH-adjusted aqueous egg yolk mixture to about 40 to about 80° C. for a period of about 30 minutes or longer;
   (4) cooling the heat treated aqueous egg yolk mixture to or near ambient temperatures; and
   (5) adding an acidic material to the cooled aqueous egg yolk mixture to a neutral pH, thereby forming the aqueous egg yolk composition;
   wherein the aqueous egg yolk composition can be used in food compositions to impart improved egg yolk functionality.

2. The process defined in claim 1, wherein the alkaline material is sodium hydroxide, calcium hydroxide, trisodium phosphate, potassium hydroxide, magnesium hydroxide, ammonium hydroxide, and mixtures thereof.

3. The process as defined in claim 1, wherein the pH of the pH-adjusted aqueous egg yolk mixture is about 7.5 to about 12.

4. The process as defined in claim 2, wherein the pH of the pH-adjusted aqueous egg yolk mixture is about 7.5 to about 12.

5. The process as defined in claim 3, wherein the pH of the pH-adjusted aqueous egg yolk mixture is about 8 to about 10.

6. The process as defined in claim 4, wherein the pH of the pH-adjusted aqueous egg yolk mixture is about 8 to about 10.

7. The process as defined in claim 3, wherein the pH-adjusted aqueous egg yolk mixture is heated to about 50 to about 75° C.

8. The process as defined in claim 4, wherein the pH-adjusted aqueous egg yolk mixture is heated to about 50 to about 75° C.

9. The process as defined in claim 7, wherein the pH-adjusted aqueous egg yolk mixture is heated to about 60 to about 70° C.

10. The process as defined in claim 8, wherein the pH-adjusted aqueous egg yolk mixture is heated to about 60 to about 70° C.

11. The process as defined in claim 7, wherein the pH of the aqueous egg yolk composition is about 5 to 6.

12. The process as defined in claim 8, wherein the pH of the aqueous egg yolk composition is about 5 to 6.

13. An aqueous egg yolk composition with improved egg yolk functionality for use in food compositions, wherein the aqueous egg yolk composition is prepared by a process comprising:
    (1) forming an aqueous egg yolk mixture;
    (2) adding an alkaline material to the aqueous egg yolk mixture in an amount sufficient to adjust the pH of the aqueous egg yolk mixture to about 7.5 or above;
    (3) heating the pH-adjusted aqueous egg yolk mixture to about 40 to about 80° C. for a period of about 30 minutes or longer;
    (4) cooling the heat treated aqueous egg yolk mixture to about 20° C. to about 30° C.; and
    (5) adding an acidic material to the cooled aqueous egg yolk mixture to adjust the cooled aqueous egg yolk mixture to a neutral pH, thereby forming the aqueous egg yolk composition;
    wherein the aqueous egg yolk composition can be used in food compositions to impart improved egg yolk functionality.

14. The aqueous egg yolk composition as defined in claim 13, wherein the alkaline material is sodium hydroxide, calcium hydroxide, trisodium phosphate, potassium hydroxide, magnesium hydroxide, ammonium hydroxide, and mixtures thereof.

15. The aqueous egg yolk composition as defined in claim 13, wherein the pH of the pH-adjusted aqueous egg yolk mixture is about 7.5 to about 12.

16. The aqueous egg yolk composition as defined in claim 14, wherein the pH of the pH-adjusted aqueous egg yolk mixture is about 7.5 to about 12.

17. The aqueous egg yolk composition as defined in claim 15, wherein the pH of the pH-adjusted aqueous egg yolk mixture is about 8 to about 10.

18. The aqueous egg yolk composition as defined in claim 16, wherein the pH of the pH-adjusted aqueous egg yolk mixture is about 8 to about 10.

19. The aqueous egg yolk composition as defined in claim 15, wherein the pH-adjusted aqueous egg yolk mixture is heated to about 50 to about 75° C.

20. The aqueous egg yolk composition as defined in claim 16, wherein the pH-adjusted aqueous egg yolk mixture is heated to about 50 to about 75° C.

21. The aqueous egg yolk composition as defined in claim 19, wherein the pH-adjusted aqueous egg yolk mixture is heated to about 60 to about 70° C.

22. The aqueous egg yolk composition as defined in claim 20, wherein the pH-adjusted aqueous egg yolk mixture is heated to about 60 to about 70° C.

23. The aqueous egg yolk composition as defined in claim 19, wherein the pH of the aqueous egg yolk composition is about 5 to 6.

24. The aqueous egg yolk composition as defined in claim 20, wherein the pH of the aqueous egg yolk composition is about 5 to 6.

25. The process of claim 1, wherein the heat treated aqueous egg yolk mixture is cooled to a temperature of between about 20° C. to about 30° C.

26. A process for preparing an aqueous egg yolk composition having improved egg yolk functionality, said process comprising:

(1) forming an aqueous egg yolk mixture;

(2) adding an alkaline material to the aqueous egg yolk mixture in an amount sufficient to adjust the pH of the aqueous egg yolk mixture to about 7.5 or above;

(3) heating the pH-adjusted aqueous egg yolk mixture to about 40 to about 80° C. for a period of about 30 minutes or longer;

(4) cooling the heat treated aqueous egg yolk mixture to or near ambient temperatures; and (5) adding an acidic material to the cooled aqueous egg yolk mixture to a natural pH, thereby forming the aqueous egg yolk composition;

wherein the aqueous egg yolk composition can be used in food compositions to impart improved egg yolk functionality, and wherein addition of β-cyclodextrin is not included in the process.

27. A process for preparing an aqueous egg yolk composition having improved egg yolk functionality, said process consisting essentially of:

(1) forming an aqueous egg yolk mixture;

(2) adding an alkaline material to the aqueous egg yolk mixture in an amount sufficient to adjust the pH of the aqueous egg yolk mixture to about 7.5 or above;

(3) heating the pH-adjusted aqueous egg yolk mixture to about 40 to about 80° C. for a period of about 30 minutes or longer;

(4) cooling the heat treated aqueous egg yolk mixture to or near ambient temperatures; and (5) adding an acidic material to the cooled aqueous egg yolk mixture to a natural pH, thereby forming the aqueous egg yolk composition;

wherein the aqueous egg yolk composition can be used in food compositions to impart improved egg yolk functionality.

* * * * *